Dec. 17, 1968         W. GOLLER ETAL         3,416,658
PROCESS OF AUTOMATICALLY PERFORMING LENGTH MEASUREMENTS AND
SELF-CALIBRATING MEASURING AND SORTING APPARATUS
FOR CARRYING OUT THE PROCESS Filed April 27, 1966         4 Sheets-Sheet 1

Inventor:

United States Patent Office 3,416,658
Patented Dec. 17, 1968

3,416,658
PROCESS OF AUTOMATICALLY PERFORMING LENGTH MEASUREMENTS AND SELF-CALIBRATING MEASURING AND SORTING APPARATUS FOR CARRYING OUT THE PROCESS
Walter Goller, Hammerlestrasse 39, Feldkirch-Gisingen, Austria; and Karl Max Harder, Bannholzstrasse 277, and Werner Haechler, Lett, both of Vaduz, Liechtenstein
Filed Apr. 27, 1966, Ser. No. 546,160
17 Claims. (Cl. 209—73)

ABSTRACT OF THE DISCLOSURE

A process and an apparatus for automatically performing length measurements on test specimens in apparatus comprising a gauge gap which has an abutment at one end and a sensing head having a feeler at the other end, the feeler being movable and constituting a variable element of a compensating electric network. The test specimens are moved through the gauge gap and a master specimen is moved through the gauge gap. The difference between the dimensions of each test specimen and the corresponding dimension of the master specimen is measured and a reference value is determined. The master specimen is moved through the gauge gap again and the reference value is automatically readjusted stepwise and in dependence upon the differences between the results of repetitive measurements.

---

Processes are known in which precision parts are automatically measured and, more particularly, "go" products are separated from products having dimensions above or below an allowable tolerance range and are sorted. Equipment which is suitable for carrying out such process contains generally a fixed abutment in the form of a measuring table, and a sensing unit, which faces the abutment. The measuring table and the sensing unit are connected by a bent member and are adjustable relative to each other and can be fixed in their adjusted relative position. The measuring table, sensing unit and bent member form together a gauge. The sensing unit has a feeler head, in which a feeler pin is longitudinally slidable and guided parallel to the axis of the feeler head. The test specimens are introduced into the gauge and deflect the feeler pin by an amount which depends on the dimensions of each specimen. Depending on the precision which is required, the displacement of the feeler pin is mechanically or electrically transmitted to a suitable indicating device. The electric transmission may be effected, e.g., by capacitive or inductive coupling means. The dimension of the test specimen can be read from the indicating device. When it is not desired to ascertain the absolute dimensions of the test specimen but a sorting is to be effected by finding out whether the test specimen has the specified dimensions or differs from the same within an allowable tolerance range, a master specimen is used to set the indicating device to a certain deflection and the test specimens are subsequently measured to find out whether their dimensions are within the predetermined, allowable tolerance range. The limits of this range are mechanically or electrically fixed. Depending on whether the deflection of the instrument is within the predetermined limits or above or below the same, the test specimen which has caused this deflection may be routed by suitable means into a channel for "go" products or into channels for oversize and undersize products, respectively.

Some versions of this measuring equipment must operate entirely automatically so that the testing work can be incorporated in the general manufacturing process. As has already been mentioned, the sensing unit is designed so that the position of the feeler pin relative to the feeler head results in an inductive or capacitive unbalancing of a measuring bridge. This gives an output, which corresponds to the size of the test specimen. The output value is fed to an electrical measuring instrument. Electrical stages in the form of bistable elements, multivibrators, called flip-flops, thyratrons, switching diodes, self-holding relays etc. are connected in parallel to the electrical measuring instrument and are set to be operated by a value which corresponds to the lower limit of the tolerance range, or by a value which corresponds to the upper limit of the tolerance range. Before the test specimen is measured, both stages are in an initial condition. A collecting channel for the tested specimens is connected to a routing channel for undersize test specimens. If the tested specimen is undersize, the connection is maintained. If the test specimen is a "go" product, one of the trigger stages responds and operates suitable deflectors so that the collecting channel is connected to the "go" channel. If the dimension of the tested specimen is above the upper limit, the second trigger stage responds too and moves another deflector into such a position that the collecting channel is connected to the channel for oversize test specimens.

Measuring equipment of the kind described is generally satisfactory but has the disadvantage that errors which are due to geometric changes of the once adjusted width of the gauge enter into the measurement so that even test specimens having a dimension which is inherently outside the tolerance range are sorted into the "go" channel or test specimens which are within the "go" range are rejected.

Such changes of the gauge size may be due, e.g., to temperature changes, or to a release of internal mechanical stresses in the system. Shocks and vibration are transmitted to the measuring system. Deposited dust and dirt, occluded water vapor, substances deposited from the atmosphere etc. form films, which are included in the measurement. It may be attempted to avoid these detrimental effects by a selection of suitable materials, air conditioning, keeping the measuring room free of dust, using vibration-free foundations etc. Such measures, however, involve high costs and the compensation cannot be carried so far that even very small deviations of the measuring system from the initial setting are reliably eliminated. With particularly close tolerances, e.g. of 1 micron and less, as are required in the manufacture of anti-friction bearings, it is extremely difficult to maintain the gauge size constant. Under these circumstances, temperature changes of only one degree centigrade may be significant and deposited dust may have an important effect. Still higher requirements are to be met, e.g., in the manufacture of electric circuit elements from semiconductors. In this case the provision of layers having a predetermined thickness in the semiconductor bodies is essential when the electrical behavior of the circuit elements depends highly on the thickness of the layer.

These relationships are known and for this reason it has already been attempted to solve the problem which becomes apparent from what has been said hereinbefore. According to a previous proposal, the master specimen is placed into the gauge, the indicated measuring value is stored in a fast-acting storage device (capacitor, Hall generator or the like) and the stored value is algebraically added to the indicated measured value which is representative of the test specimen. The resulting algebraic sum of the measured values or the difference between corresponding electric voltages will then represent the exact measured deviation of the test specimen from the master, irrespective of undesired changes of the gauge side, so that the sum value or the voltage difference may be used for an automatic operation of a movable deflector of the sorting channel system.

This process results in the highest accuracy which is conceivable and for this reason must be adopted, in spite of the relatively high mechanical and electrical expenditure involved in it, where this maximum accuracy is required. There are a number of cases, however, where this expenditure is not necessary.

It is an object of the present invention to enable a successful operation also when a lower accuracy is sufficient, although this accuracy is still very high, absolutely speaking, in a process which can be carried out with means which enable an economical performance of measurements which are to be carried out automatically.

The invention is based on the recognition that it is necessary in such cases to store the values sensed from the master specimen but it is sufficient to compare the stored value with a preset, constant electrical value. If the stored value differs from the set constant value, switching stages which act as zero switches respond to energize and de-energize a positioning motor, by which the slide tap of a potentiometer included in the compensation measuring circuit is displaced until both values are the same. An allowable deviation may be provided for. For instance, the switching stages may be arranged to define two limiting values and errors within these limiting values may be tolerated. Only when the value which is representative of the master specimen is outside the range defined by the limiting values, one of the two above-mentioned switching stages is triggered to energize a positioning motor, which adjusts a bridge element of the measuring circuit until the measured value of the master specimen is back within the set limiting values. The switching stage which has been operated is then considered a storage device, which states whether the measured value obtained from the master specimen is outside or inside the set limiting values.

The last-mentioned method may be modified in that the same master specimen is moved several times in succession through the gauge gap. In this case the positioning motor consists of a stepping switch, which introduces changes into the measuring circuit which correspond to the value of the allowable error when the master specimen is moved through the gauge and the limiting values are exceeded. The master specimen is then moved through the gauge until the error is back within the limiting values. In this operation it may be necessary to move the master specimen relatively often through the gauge until the measuring circuit is again in the correct condition. To avoid an excessive number of repetitions of the movement of the master specimen through the gauge, additional switching stages are provided in addition to the two above-mentioned limit switching stages. Depending on which of these stages is operated, the stepping switch is caused to perform relatively small or relatively large steps. In this case it will be sufficient to move a master specimen only once or twice through the gauge until the measuring circuit is again in the desired condition. In such an arrangement, all switching stages must be considered storage devices, which indicate whether and how often the measuring circuit has been changed.

Based on these recognitions, a method of automatically performing length measurements in devices having a gauge gap, which is defined on one side by a fixed abutment and on the other side by a sensing head having a feeler, which is movable in dependence on the measured length, said feeler constituting a variable element of an electrical compensating circuit, and a reference value being determined by introducing into the gauge a master specimen, which moves through the gauge like a test specimen, is characterized according to the invention in that the reference value is changed in dependence on the amount of the difference between the measured values which is due to changes in the conditions of the apparatus.

In accordance with the recognitions which have been explained hereinbefore and which have led to the invention, the method suggested according to the invention is particularly characterized in that the voltage value which is generated by the first pass of the master specimen has associated with it two further voltage values, which are preferably symmetric with respect to the first-mentioned voltage value and define a voltage range so that all voltage values which are generated by repeated passes of the master specimen through the gauge and lie within that range are considered acceptable and do not initiate a re-adjustment, whereas all voltage values which are obtained by repeated passes of the master specimen through the gauge and are outside said range are automatically utilized for a stepwise re-adjustment of the reference value and in this case the master specimen is moved through the gauge until the resulting voltage values are again within the acceptable range.

In a further modification of the method, the two predetermined voltage values may correspond to errors which are smaller than the largest allowable error of the measuring device, and a further, wider voltage range may be provided, which is also preferably symmetrical to the voltage values within the acceptable range, and these two additional voltage values may correspond to errors of the measuring device which are within the limits of the allowable error.

If the voltage value obtained during a pass of the master specimen is within the second range but outside the first range, the automatic, stepwise re-adjustment of the reference value will be initiated whereas the entire installation will be automatically shut down if the voltage value obtained during a repeated pass of the master specimen is outside the second range.

The method according to the invention may be further modified in that there is no response during the first calibrating pass in an automatic check if the limits of the second range are exceeded and the machine will only be shut down if the limits of the second range are exceeded during each of at least two successive calibrating passes within an automatic check. A dust particle or the like may adhere to the master specimen and may introduce an error when the master specimen passes through the gauge. If this error is so small that the measured values are within the second range, this error will be insignificant and would only result in a change of the reference value within the allowable limits. This change is not necessary, although it would not be detrimental. If the error is so large that it results in a measured value beyond the limits of the second range, the machine would unnecessarily be shut down and the operator would have to intervene. This may result in considerable losses of time, which are not necessary. According to the invention such a dust particle will be stripped off by the elements defining the gauge gap during the first pass and in any case during the second pass so that the second pass and in any case the third pass of the master specimen will result in satisfactory measured values.

The intervals of time between the subsequent passes of the master specimen depend mainly on the environmental conditions. The poorer they are, the shorter must be the intervals of time, and vice versa. For this reason, it is another feature of the invention to provide for an adjustment of these intervals of time. The calibration and sorting are carried out with the aid of bistable elements, which are serially connected in stages in accordance with the voltage ranges of the individual storage devices. Those stages consisting of bistable elements which are intended for calibration are preferably rendered operative only during a calibration and these stages of bistable elements which are intended for sorting are preferably rendered operative only during sorting. It is also desirable to adjust the calibrating stages of bistable elements independently of the sorting stages of bistable elements. It is further desirable to feed test specimens which have been sorted between two calibrations first to an intermediate container and to feed them thereafter to the main collecting container when the second calibration does not exceed a predetermined deviation from the first calibration, whereas the measuring operation is automatically interrupted when this predetermined deviation is exceeded during the calibration.

An increase of the voltage in the bridge circuit will increase the ratio of the displacement of the feeler pin and the voltage value so that calibration can be effected with a higher accuracy when sorting.

Self-calibrating measuring and sorting apparatus according to the invention, comprising a gauge gap, which is defined on one side by a fixed abutment and on the other side by a feeler head, which has a feeler that is movable in dependence on the measured length and constitutes a variable element of an electric compensating circuit, a reference value being established by passing a master specimen through the gauge gap like a test specimen, may be designed in various ways. It is preferably characterized by the provision of a conveyor, particularly in the form of a turntable, for the test specimens to be moved through the gauge gap and for a master specimen, which is moved by the conveyor and is repeatedly moved through the gauge gap in predetermined intervals of time. Such conveyor has associated with it the measuring and calibrating circuits and the sorting device, which circuits and device are required for carrying out the above-mentioned method steps and will be described in more detail in connection with an embodiment shown by way of example in the accompanying drawings.

In these drawings:

FIG. 1 shows only those parts which are used for measuring and sorting.

The test specimens to be measured and sorted lie in a hopper 1 (FIG. 1), from which the test specimens fall into the slots 2 of a feeding turntable 3, which is continuously rotated in the direction of the arrow A by the motor 6 through the intermediary of the shaft 4 and the transmission 5. By this rotation, the test specimens disposed in the slots 2 are individually moved through a gauge gap at the measuring station 9. This gauge gap is defined by the measuring table 7 and the feeler pin 8. The test specimen is thus pushed between the measuring table 7 and the feeler pin 8 so that the specimen urges the feeler pin against the force of the spring 10 into the housing of the measuring station 9 by an amount which depends on the size of the test specimen.

Figure 1:
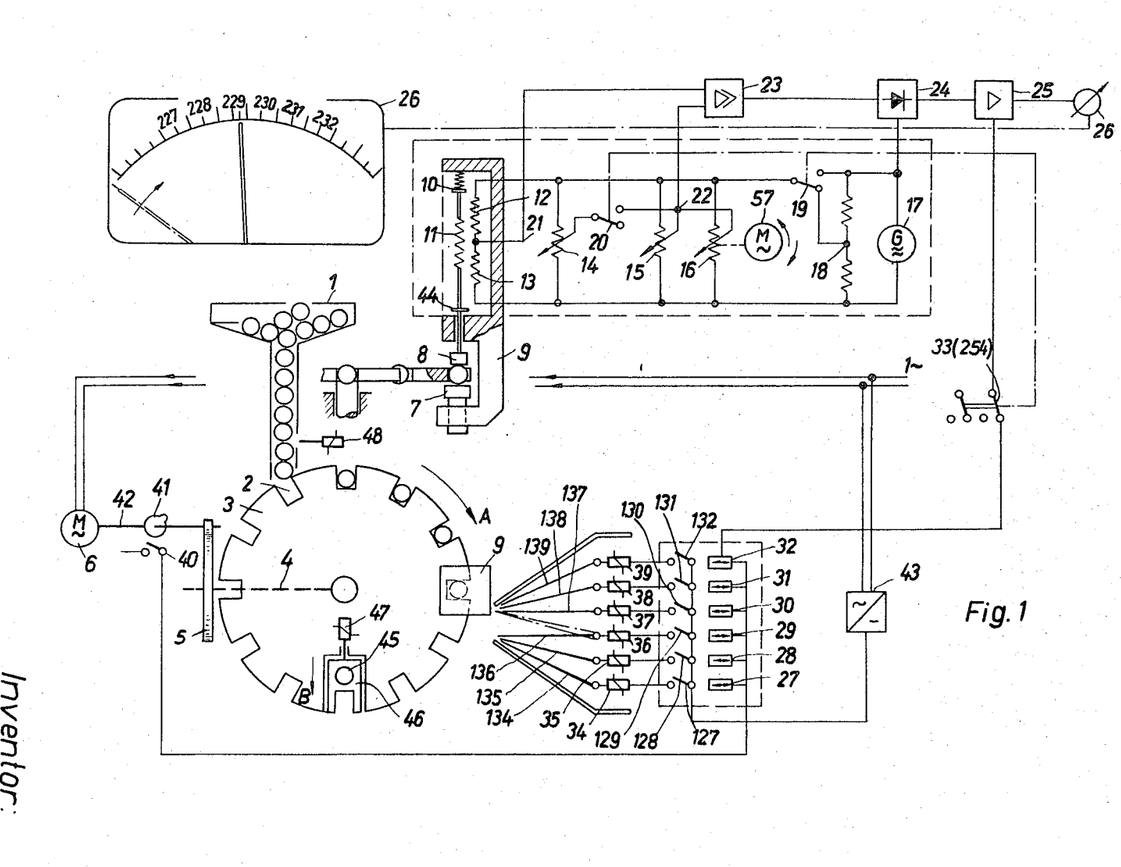
FIG. 1 is a diagrammatic view showing an apparatus embodying the invention and comprising automatic measuring, calibrating and sorting means.

The feeler pin 8 is connected at its top end to a Ferroxcube core 11, which determines the self-inductance of the two inductance coils 12 and 13. The further the feeler pin and the Ferroxcube core are pushed into the housing, the higher will be the self-inductance of the coil 12 and the smaller will be the self-inductance of the coil 13. Potentiometric resistors 14, 15 and 16 form a compensating circuit together with the coils 12 and 13. The resulting circuit is fed by the generator 17 through the voltage divider 18 at about 15 kilocycles per second. Depending on the condition of the switch 19, a part of the voltage or the full voltage of the generator 17 is applied to the circuit. Depending on the condition of the switch 20, the slide tap of the potentiometer 14 is connected to the slide taps of potentiometers 15 and 16 or may be disconnected from the same. The condition assumed by the switches 19 and 20 during normal sorting operation is shown in FIG. 1, where the slide tap of potentiometer 14 is disconnected and only a part of the voltage of the generator 17 is applied to the circuit.

Under these conditions, an A.C. voltage is applied between points 21 and 22. The amplitude of this voltage depends on the position of the Ferroxcube core 11 relative to coils 12 and 13 and on the position of the slide taps of the potentiometers 15 and 16. This voltage is amplified by the amplifier 23, subjected to a phase-dependent rectification at 24, further amplified by the D.C. amplifier 25, and fed to the indicating instrument 26. The indicating instrument 26 is shown in a further enlarged view in FIG. 1. There is thus a direct dependence of the voltage value indicated by the indicating instrument and the size of the test specimen. The apparatus is preset with a master specimen, which is introduced into the gauge gap. For this purpose, the abutment 7 is mechanically adjusted until the indicating instrument shows approximately the initial value, e.g., in the middle of the scale. An exact adjustment to this value is effected by a displacement of the slide tap of the potentiometer 15. The indicating instrument will now indicate the amount by which any test specimen in the gauge gap differs in size from the master specimen.

Sorting

To enable an automatic selection, the D.C. voltage which has been amplified in the amplifier 25 is not only applied to the indicating instrument but is applied by the switch 33 also to the bistable elements 27, 28, 29, 30, 31, 32 (relays having a holding contact, flip-flop stages, thyratrons, switching diodes, etc.). These elements are so adjusted that the element 27 is operated when, e.g., the graduation 227 of the indicating instrument, and the element 28 is operated when, e.g., the graduation 228 is reached. Each of these elements has associated with it one of the switches 127, 128, 129, 130, 131, and 132, which connect associated solenoids 34, 35, 36, 37, 38, and 39 to the D.C. source 43. Each of these solenoids has associated with it one of the deflector blades 134–139 and effects an outward pivotal movement of the respective blade when the solenoid is energized. The deflector blade which has been swung out will conduct the test specimen into the container which corresponds to the relation of the test specimen to the tolerance range.

The bistable elements are self-holding, which means that a short pulse is required for operating them and a second pulse for resetting them. The elements are interlocked so that the element which is operated restores the preceding element. As a result, only the element which has been operated last remains in its position even when the pulse has been terminated. All preceding elements have then been reset. For resetting the element which has been operated last, an erasing pulse is required, which is produced by the switch 40. This switch is operated by the cam 41 mounted on the drive shaft 42. As the transmission has a speed-reducing ratio which corresponds to the number of the slots 2 in the feeding turntable, e.g., a ratio of 1:12 if there are twelve such slots, as in the example, the switch 40 will be operated for a short time whenever the feeding turntable moves from one slot to the next. The cam 41 is adjusted to operate the switch 40 for a short time before a test specimen reaches the gauge gap. This operation causes the elements 27–32, the solenoids 34–39 and the deflector blades 134–139 to assume their initial condition, shown in FIG. 1.

Before the test specimen has reached the gauge gap, the feeler pin 8 is urged out of the housing by the spring 10 to engage the stop pin 44 carried by the housing. This causes a change of the D.C. voltage at the output of the D.C. amplifier 25 through zero to a negative value. As a result, none of the switching elements 27 to 32 receives an energizing pulse and the indicating instrument 26 indicates a negative value (position of pointer shown in dash-dot lines). When the feeding plate 3 pushes the test specimen into the gauge gap, the test specimen will urge the feeler pin into the housing so that the D.C. voltage at the output of the amplifier 25 will increase. When this voltage has increased to that the pointer of the indicating instrument has reached, e.g., the graduation 227, this voltage will be just sufficient to cause an operation of the first element 27 of the bistable elements 27–32. A further increase of the voltage, e.g., until the pointer of the indicating instrument has reached the graduation 228, will cause an operation of the bistable element 28. This operation of the element 28 resets the element 27. The voltage will not increase further when the test specimen has been moved entirely into the gauge gap.

It may be assumed that at this time the voltage has increased to the value which is represented by the pointer shown in solid lines, beyond the graduation 229. This means that the bistable element 29 has been operated and has reset the element 28 and closed the switch 129 to energize the solenoid 36, which pivotally moves the deflector blade 136 to the position shown in dash-dot lines. The deflector blades 135 and 136 form now a channel, which leads to the container (not shown) for receiving those test specimens which have a size corresponding to an electrical value between the graduations 229 and 230. The test specimen is subsequently moved out of the gauge gap so that the voltage is changed through zero to a negative value. The bistable element 29 remains in its operated condition so that the channel defined by the deflector blades 135 and 136 is maintained. The test specimen drops into this channel and is guided along the same to the container, not shown, which corresponds to the relation of this test specimen to the tolerance range. Before the next test specimen reaches the gauge gap, the cam 41 closes the switch 40 for a short time so that the bistable element 29 is reset and opens the contact 129. This causes the deflector blade 136 to return to its initial position, shown in solid lines.

Calibration

For an automatic control of the setting of the gauge gap, the master specimen 45 is disposed during operation in the holder 46, which is displaceable in the feeding turntable 4 in the direction of the arrow B. In predetermined intervals of time amounting, e.g., to 10–5 minutes, the feeding of test specimens is automatically blocked by the solenoid 48 (FIG. 2) and at the same time the holder 46 is advanced by the solenoid 47 so that the master specimen 45 lies in the feeding turntable 3 exactly where otherwise the test specimens are disposed. The master specimen 45 is moved in this position through the gauge gap by the feeding turntable 3. A check is then made whether the original setting of the apparatus to the master specimen is still correct within predetermined limits (229–230). When these limits are exceeded, the motor-operated potentiometer 16 is re-adjusted by a predetermined amount, which corresponds, e.g., to ⅔ of the acceptable range. This step is repeated until the measured value which is obtained during a pass of the master specimen is within the predetermined limits. The solenoids 47–48 are then de-energized so that the feeding of test specimens is resumed and the holder 46 is retracted. The normal operation is subsequently continued.

The timer 49 (FIG. 2) feeds after a predetermined, adjustable time, e.g., 15 minutes, a pulse to the relay 50 so that its switches 150 and 250 are closed. The switch 150 holds the relay energized even when the pulse from the timer has terminated.

When the feeding turntable is approximately in the position shown in FIG. 1, the cam 51 secured to the shaft 4 (FIG. 2) closes the switches 151 and 251 so that the relay 50 is energized and closes its switch 250 to energize the relay 52, which closes its switches 152 and 252. The switch 152 maintains the relay 52 energized even when the cam-operated switch 251 has been opened. The closing of the switch 252 of relay 52 causes the energization of solenoids 47 and 48. The magnet 47 advances the holder 46 so that the master specimen 45 lies instead of a test specimen in the feeding turntable. The other test specimens which are in the feeding turntable are moved through the gauge gap and are sorted in the normal manner. The feeding of further test specimens into the feeding turntable is blocked by the solenoid 48.

Shortly before the master specimen reaches the gauge gap, the cap 53 secured to the shaft 4 closes the cam-operated switches 153 and 253. The closing of the cam-operated switch causes the closing of the relay switches 250 and 152 to energize the relay 54. This closes the relay switches 154 and 20 and effects a change-over of relay switches 254 and 19. By the closed switch 20, the potentiometer 14 is included in the bridge circuit. Owing to the change-over of switch 19, the full voltage of the generator 17 is now applied to the bridge circuit. As a result, the relation of the change of the measured value to the displacement of the feeler is a multiple of the relation which is obtained during normal operation when switch 19 is in the position shown in FIG. 1. When during normal operation a movement of the pointer, e.g., from the graduation 229 to the graduation 230 of the indicating instrument corresponds to a displacement of 1 micron of the feeler pin, this movement of the pointer in the switch position shown in FIG. 2 corresponds to a displacement of, e.g., 0.1 micron of the feeler pin. During the setting of the measuring station to the master specimen, the potentiometer 14 has been adjusted so that the pointer of the indicating instrument 26 is exactly at the mid-point of the scale in the condition shown in FIG. 2, where the potentiometer 14 is included in the bridge circuit. This position of the pointer is indicated in dash-dot lines in FIG. 2.

The change-over of switch 254 has disconnected the output of the amplifier 26 from the bistable elements 27–32 and has connected this output to the bistable elements 327–331. The relay switch 154 maintains the relay 54 energized even when the cam-operated switch 153 is open.

In addition to the relay 54, the cam-operated switch 153 energizes also the relay 55. When the relay switch 155 is changed over, it disconnects the bistable elements from the cam-operated switch 40 and connects them to the cam-operated switch 254, which is operated by the cam 53. As a result, the resetting is now initiated after each full revolution of the feeding turntable 3.

Figure 2:
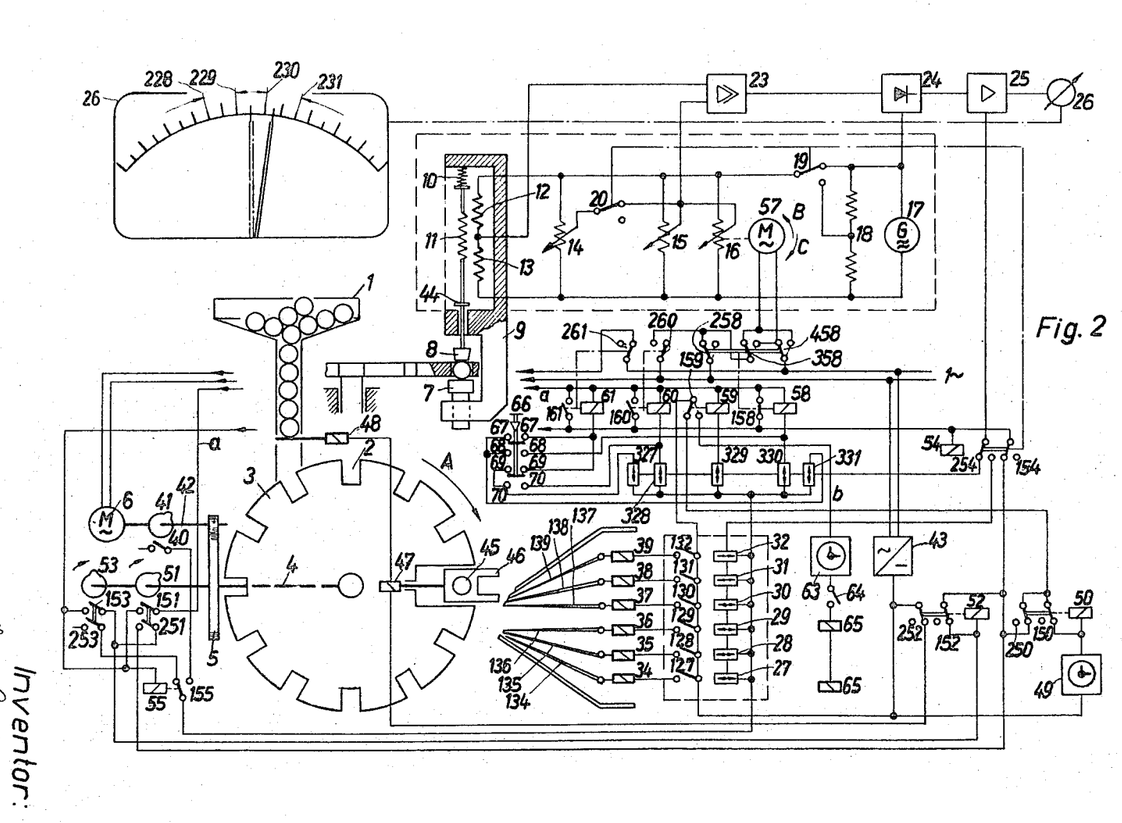
FIG. 2 is a view similar to FIG. 1 and shows also the means for self-calibration and for readjusting the reference value.

The bistable elements 327 to 331 are so adjusted that the element 327 is operated when the output voltage of 25 is highly negative so that the pointer of the indicating instrument 26 is somewhere on the left of the graduation 228 (FIG. 2). When the movement of the specimen, in this case of the master specimen, through the gauge gap causes the output voltage of 25 to go more positive, the bistable element 238 will be operated and will reset the element 327 as soon as the pointer of the indicating instrument moves across the graduation 228. Similarly, the elements 329, 330 and 332 will be operated and will simultaneously reset the respective preceding element when the pointer of the indicating instrument moves across the graduations 229, 230 and 231, respectively.

Those test specimens which are in the feeding turntable when the supply of further test specimens has been blocked by the solenoid 48 have been moved through the gauge gap when the cam-operated switches 153 and 253 are closed. These test specimens have been routed to the proper containers by the deflector blades 134–139 in accordance with their relation to the tolerance range. When the cam-operated switch 153 is closed, there is no test specimen in the gauge gap. As a result, the bistable element 327 is operated without initiating any further operation.

It may now be assumed that uncontrolled influences have resulted in a slight reduction in the width of the gauge gap from its original setting so that the pointer of the indicating instrument is between the graduations 230 and 231 (position of pointer shown in solid lines in FIG. 2) when the master specimen has been moved entirely into the gauge gap. This results in an operation of the bistable element 330 so that the relay 58 associated with said element is connected to one pole of the D.C. source 43 (this has not been represented in the drawing but only symbolized by the connection between 58 and 330). When the cam-operated switch 151 is subsequently closed by the cam 51, the other pole of the D.C. source is also connected to the relay 58 (lead *a*). The relay 58 is operated and closes the relay switch 158, opens the relay switch 258 and changes over the relay switches 358 and 458.

The relay holds itself by the relay switch 158 when the cam-operated switch 151 is opened. This relay will not be de-energized until the bistable element 330 is reset. The opening of the relay contact 258 and the change-over of the contacts 358 and 458 generates a pulse, which is fed to the stepping motor 57 and causes it to perform one step in the direction of arrow B. The motor shaft is coupled to the slide tap of the potentiometer 16 so that the latter is adjusted by a predetermined amount and the condition of the bridge consisting of the feeler coils 12, 13 and the potentiometers 14, 15, and 16 is changed accordingly. The step performed by the motor 57 in response to one pulse has such a magnitude that the bridge is adjusted by an amount which corresponds to a movement of the pointer of the indicating instrument by about $\frac{2}{3}$ of the distance between two switching points (228–229= 229–230=230–231). In the present example, the step performed by the motor 57 would have the result that the pointer of the indicating instrument moves back to a position between the two switching points 229 and 230, fairly exactly midway between these points. This position of the pointer is indicated in dash-dot lines in FIG. 2. The reading of the measuring instrument 26 and the condition of the bridge circuit have now been adjusted as though the gauge gap had been returned to its original setting.

The bistable element 330 remains energized until the feeding turntable 3 has performed one revolution and the cam-operated contact 253 has caused a resetting of the element 330. As a result, the relay 58 is de-energized so that the relay switches 158, 258, 358 and 458 return to their position shown in dash-dot lines. Soon after the resetting, the master specimen is moved once more through the gauge gap. The pointer of the indicating instrument will now assume the corrected position which is due to the adjustment of the potentiometer 16. Now the bistable element 329 will be operated, as the pointer has moved past the switching point 229 but has not reached the switching point 230.

The associated relay 59 has thus been connected to one pole of the D.C. source. This connection is not represented in the drawing but only symbolized by the connection between 59 and 329. When the cam-operated switch 151 is subsequently closed by the cam 51, the other pole of the source of current 43 is also connected to the relay 59. The latter opens the switch 159 to interrupt the holding circuit for relays 50, 52, 54 and 55 so that these relays are returned to their original condition and reset the switches to their original condition, shown in FIG. 1. The solenoids 47 and 48 are de-energized so that the master holder 46 is returned to its normal position (FIG. 1) and additional test specimens can be fed to the feeding turntable. The normal sorting is now resumed. The resetting contact 40 is now operative to reset the bistable element 329 so that the relay contact 159 is closed. The time-limit relay 49 is energized and after the present time delay will initiate the same calibrating operation once more.

If the undesired change of the gauge gap is larger than in the example which has been described and the pointer of the indicating instrument moves almost to the switching point 231 during the passage of the master specimen but does not reach this point, the step of the stepping motor 57 will not re-establish the original setting of the gauge gap. The pointer of the indicating instrument will be on the right of switching point 230 in the position shown in solid lines in FIG. 2. After the resetting of the switches, the second movement of the master specimen through the gauge gap will result in another operation of the bistable element 330 so that a second pulse will be fed to the stepping motor 57 by the relay switches 258, 358, 458. This motor will then perform a second step in direction B so that now only, after the second pass of the master specimen, the changes are so corrected that the original setting of the gauge gap has been re-established. The third pass of the master specimen will cause an operation of the bistable element 329 to re-establish the condition for normal sorting.

If the gauge gap is subjected to an unintended change in the opposite sense so that it is increased, the first pass of the master specimen will cause the pointer of the indicating instrument to assume a position between switching points 228 and 229 without reaching the latter. Only the bistable element 338 will be operated and after the operation of the cam-operated contacts 151 will cause the relay 60 to close the switch 260 whereas the switches 258, 358 and 458 will remain in their original position, indicated in dash-dot lines in FIG. 2. The closing of switch 260 will then cause a current flow in the opposite direction through the stepping motor 57, which will perform its steps in the direction C and thus cause a re-adjustment of the bridge in the opposite sense. Each step of 57 will cause a movement of the pointer to the right until the pointer has reached the area between switching points 229 and 230. In this position of the switch, the bistable element 329 will energize the relay 59 so that the switch thereof will be opened to re-establish the conditions for normal sorting.

If the gauge gap is subjected to an unintended change in one direction or the other to such an extent that the movement of the master specimen through the gauge gap causes a movement of the pointer to a position short of the switching point 228 or beyond the switching point 231, the bistable element 327 or 331 will be operated upon the passage of the master specimen. Both elements act on the relay 61 so that the same will be energized when the switch 151 is closed. The relay will open the switch 261 to de-energize the drive motor 6 of the automatic testing apparatus.

At least part of the test specimens which have been moved through the automatic apparatus from the preceding calibrating operation to this calibrating operation have been mis-sorted because the measurement of the master specimen has indicated that the gauge gap had changed to an unallowable extent (pointer has not reached 228 or exceeded 231). To prevent a feeding of mis-sorted test specimens into the collecting boxes in such case, the test specimens sorted between successive calibrating operation are collected in intermediate containers.

Figure 3:
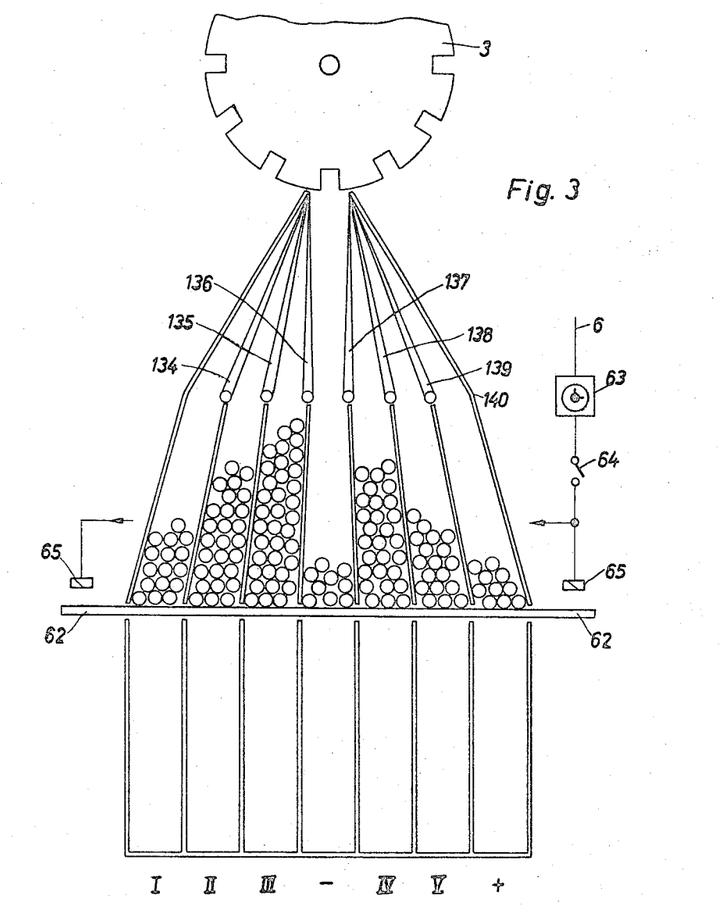
FIG. 3 is a diagrammatic view showing the movable deflectors of the sorting device with an intermediate container for receiving the test specimens between successive calibrations.

FIG. 3 shows the sorting deflector arrangement including intermediate containers, which are defined by the deflector blades 134 to 140, and the collecting containers I to +.

For the sake of a clear representation, the solenoids for operating the individual deflector blades have been omitted. It is apparent that the intermediate containers 134–140 are closed by the gate 62 so that no test specimens can enter the containers I to +. If the unintended change of the gauge gap is within the allowable limits so that only the relay 60 or 58 has been operated at the beginning of the calibrating operation, the stepping motor 57 will adjust the potentiometer 16 in the manner described hereinbefore until the gauge gap has been returned to its normal condition and the relay 59 is operated. The operation of the relay 59 resets the entire system to its normal condition and changes over the relay switch 159 to its position shown in dash-dot lines so that the time limit relay 63 (FIGS. 2 and 3) is energized. After an adjustable time of 2–3 seconds, the relay 63 closes the switch 64 so that the two solenoids 65 are energized to raise the gate 62 at right angles to the plane of the drawing. The test specimens in the intermediate containers 134 to 140 can now drop into the collecting containers I to +. After the delay to which the time limit relay 63 has been adjusted, the switch 64 is opened and the gate 62 closes the intermediate containers 134– 140 so that the test specimens which are not being sorted are collected in the intermediate containers until the next calibrating operation has been effected.

If the gauge gap has been subjected to such an unintended change at the beginning of the calibrating operation that the relay 61 is operated, the automatic apparatus will be shut down, as has been described hereinbefore. The intermediate containers 134 to 140 must now be emptied by hand and the test specimens contained in them must be returned into the automatic apparatus for being re-sorted.

To resume the operation of the automatic apparatus, the push-button 66 (FIG. 2) is depressed. This opens the contacts 67—67 and 69—69 so that the relay 61 is disconnected from the bistable elements 327 and 331 and is de-energized. The relay switch 161 is opened and the relay switch 261 is closed so that the drive motor 6 is started. The operation of the push-button has also closed the contacts 68—68 and 70—70 so that the bistable elements 331 and 330 are connected to the relay 58 and the bistable elements 327 and 328 are connected to the relay 60. If the pointer has not reached the switching point 228 or has moved beyond the switching point 231 when the master specimen has been moved through the gauge gap, the relay 60 or 58 will be operated so that the stepping motor 57 performs one step. The same is effected when the pointer has moved beyond the switching point 28 but has not reached the switching point 229, or has moved beyond the switching point 230 but has not reached the switching point 231. Only when the pointer has moved beyond the switching point 229 and has not reached the switching point 230 will the relay 59 be operated to reset the automatic apparatus to its normal condition. It is not necessary now to hold the push-button depressed.

Even when the gauge gap has been considerably changed, mis-sorted test specimens will not enter the collecting containers I to +. In such cases it is not necessary to re-adjust the gauge gap by hand because this re-adjustment is also fully automatically effected.

All electro-mechanical relays which have been mentioned in this specification may be replaced by corresponding electronic elements (flip-flops, thyratrons, switching diodes). It is not essential to provide a conveyor in the form of a turntable. For instance, the test specimens might be fed by articulated conveyor chains. In most cases, however, turntables are sufficient; they are simple and reliable in operation.

Figure 4:
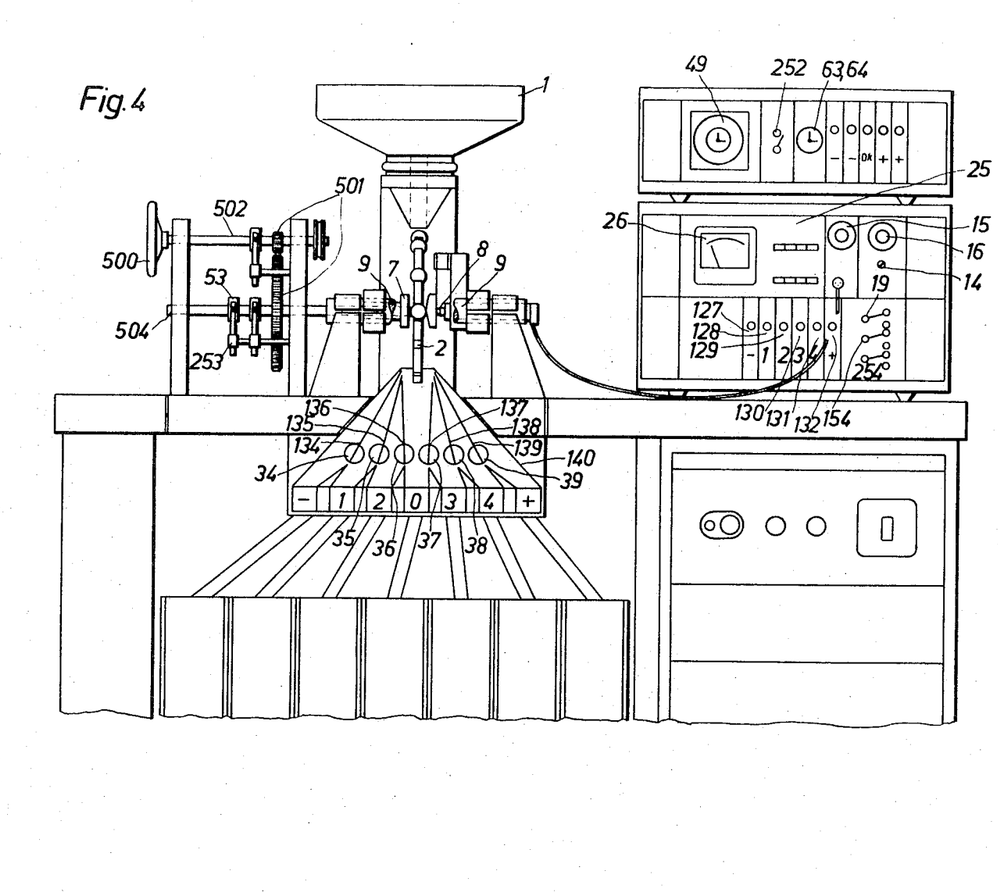
FIG. 4 is a general view of the apparatus.

In FIG. 4, those parts which are the same as shown in FIGS. 1 to 3 are designated with the same reference numbers. Numeral 500 designates a stepping wheel, by which all switches of the apparatus can be operated in the required sequence. The switch 253, which is shown in the bottom left portion of FIG. 2, is illustrated in FIG. 4, which shows how the manually operable stepping wheel 500 adjusts the cam 53 for operating the switch 253. The shafts 502, 503 are driven by the hand wheel 500 through the transmission 501 and carry cams, by which the further switches of the appartus are operated in the necessary sequence.

What is claimed is:

1. A process of automatically performing length measurements on test specimens in apparatus comprising a gauge gap, which is defined at one end by an abutment which is rigid with the apparatus and at the other end by a sensing head having a feeler, which is movable in dependance on the measured length and constitutes a variable element of a compensating electric network, said process comprising moving said test specimens through said gauge gap, moving a master specimen through said gauge gap, measuring the difference between the dimensions of each test specimen and the corresponding dimension of said master specimen, determining a reference value in dependence on the movement of said master specimen through said gauge gap, moving said master specimen in intervals of time repetitively through said gauge gap, and readjusting said reference value automatically and in steps in dependence on changing magnitudes of the differences between the results of said depetitive measurements of said master specimen carried out in intervals of time, said readjustment being adapted to eliminate an influence on the measurement of the test specimens due to changes in the condition of the gauge gap taking place between successive measurements of the master specimen.

2. A process of automatically performing length measurements on test specimens in apparatus comprising a gauge gap, which is defined at one end by an abutment which is rigid with the apparatus and at the other end by a sensing head having a feeler, which is movable in dependence on the measured length and constitutes a variable element of a compensating electric network, said process comprising moving said test specimens through said gauge gap, moving a master specimen through said gauge gap, measuring the difference between the dimensions of each test specimen and the corresponding dimension of said master specimen, determining a measured value in dependence on the first movement of said master specimen through said gauge gap, determining further values in addition to said measured value, said further values being adapted to define at least one range of measured values, moving said master specimen in intervals of time repetitively through said gauge gap, generating said measured value in dependence on each of said movements, and automatically readjusting said reference value in steps when measured values are obtained which are outside said range of measured values, said readjustment being adapted to eliminate an influence on the measurement of the test specimens due to changes in the condition of the gauge gap taking place between successive measurements of the master specimen.

3. A process as set forth in claim 2, said process comprising the further step of determining said further values so that they have equal differences from the first measured value.

4. A process as set forth in claim 2, said process comprising the further step of automatically moving said master specimen repeatedly through said measuring gap until a measured value obtained in dependence on a movement of the master specimen through said gauge gap is within said range of measured values.

5. A process as set forth in claim 2, said process comprising the further step of determining said further values so that they have equal differences from the first measured value, and selecting the differences between said further values from said first measured value so that said differences are smaller than the maximum error which is allowable in a measurement.

6. A process of automatically performing length measurements on test specimens in apparatus comprising a gauge gap, which is defined at one end by an abutment which is rigid with the apparatus and at the other end by a sensing head having a feeler, which is movable in dependence on the measured length and constitutes a variable element of a compensating electric network, said process comprising moving said test specimens through said gauge gap, moving a master specimen through said gauge gap, measuring the difference between the dimensions of each test specimen and the corresponding dimension of said master specimen, determining a measured value in dependence on the first movement of said master specimen through said gauge gap, determining at least four further values in addition to said measured value, said further values being adapted to define at least three ranges of measured values, said further values being selected so that the first measured value lies midway in the intermediate one of said ranges of measured values, determining a reference value in dependence on the movement of said master specimen through said gauge gap, moving said master specimen in intervals of time repetitively through said gauge gap, and automatically readjusting said reference value in steps when measured values are obtained which are outside the intermediate range of measured values and in adjacent ranges, and terminating the further automatic performance of the measuring process when measured values are obtained which are outside said ranges of measured values, and moving said master specimen repeatedly and automatically through said gauge gap until a measured value is in the range of measured values which contains said first measured value.

7. A process as set forth in claim 6, said process comprising the further step of selecting the differences of said further values which define the intermediate range of measured values from the first measured value so that said differences are smaller than the maximum error which is allowable in said measurements.

8. A process as set forth in claim 2, said process comprising the steps of storing said first measured value, storing measured values obtained in dependence on repeated movements of said master specimen through said gauge gap, and adjusting said compensating circuit in response to any difference between the stored first value and the measured values stored upon the second and following movements of the master specimen through said gauge gap until a measured value is within a range of measured values which contains the first measured value.

9. A process as set forth in claim 1, said process comprising the step of varying the interval of time between two successive movements of the master specimen through the gauge gap.

10. A process of automatically performing length measurements on test specimens in apparatus comprising a gauge gap, which is defined at one end by an abutment which is rigid with the apparatus and at the other and by a sensing head having a feeler, which is movable in dependence on the measured length and constitutes a variable element of a compensating electric network, said process comprising moving said test specimens through said gauge gap, moving a master specimen through said gauge gap, measuring the difference between the dimensions of each test specimen and the corresponding dimension of said master specimen, determining in dependence on the first movement of said standard specimen through said gauge gap a voltage value in said compensating circuit, determining further voltage values in addition to said voltage value, said further voltage values defining at least one voltage range between them, moving said master specimen in intervals of time repetitively through said gauge gap, and determining said voltage value in dependence on each movement, automatically readjusting said reference value in steps when voltage values are obtained which are outside said voltage range, said readjustment being adapted to eliminate an influence on the measurement of the test specimens due to changes in the condition of the gauge gap taking place between successive measurements of the master specimen, said process comprising the further step of converting said voltage values into control pulses in dependence on whether said voltage values are within or outside said voltage range, said control pulses being adapted to sort said test specimens.

11. A process as set forth in claim 10, said process comprising the further step of reducing the voltage in the compensating circuit when the apparatus is used for the performance of sorting operations relative to the voltage in the compensating circuit when the apparatus is used for the performance of readjustments.

12. A process as set forth in claim 10, said process comprising the further step of retaining presorted test specimens before they are discharged into collecting containers which contain properly sorted test specimens, and terminating the automatic repetition of the measurement of test specimens when measured values are obtained which differ from the master specimen more than by the maximum allowable error.

13. Self-calibrating length measuring and sorting apparatus, said apparatus comprising, in combination, a gauge comprising a measuring table and a sensing head having a feeler which is movable in dependence on the measured length, electric components which are controlled by the position of the feeler pin and arranged in a measuring circuit forming a Wheatstone bridge, said apparatus further including a conveyor for test specimens and for a master specimen, means adapted to feed the test specimens and the master specimen in predetermined intervals of time through said gauge, said apparatus comprising calibrating and sorting circuits which include bistable elements that are electrically dependent on said measuring circuits and adapted to effect a re-adjustment of the measuring circuit and to operate movable sorting deflectors included in a sorting circuit.

14. Apparatus as set forth in claim 13, said apparatus comprising, in combination, bistable elements both in the measuring circuit and in the sorting circuit.

15. Apparatus as set forth in claim 13, said apparatus comprising, in combination, a gauge comprising said bistable element being arranged in successive stages corresponding to the voltage ranges between said voltage values.

16. Apparatus as set forth in claim 13, said apparatus comprising, in combination, means arranged before said conveyor for test specimens and for the master specimen and adapted to block the feeding of test specimens to the conveyor when a master specimen is in the conveyor.

17. Apparatus as set forth in claim 13, said apparatus comprising, in combination, collecting containers for presorted test specimens, at least one intermediate container, which serves for receiving said test specimens and precedes said collecting containers in the path of said test specimens, gates between said collecting and intermediate containers, and control means for said gates, said control means being adapted to cause the test specimens to be retained before they enter the collecting containers or to release them for entrance into said collecting containers.

References Cited

UNITED STATES PATENTS

| | | | |
|---|---|---|---|
| 2,962,165 | 11/1960 | Aller et al. | 209—88 X |
| 3,039,604 | 6/1962 | Bickel et al. | 209—81 X |
| 3,064,809 | 11/1962 | Anthony et al. | 209—88 |
| 3,198,330 | 8/1965 | Wiesler et al. | 209—81 X |

ALLEN N. KNOWLES, *Primary Examiner.*

U.S. Cl. X.R.

209—74, 88; 340—265; 33—174